Patented Oct. 10, 1939

2,175,475

UNITED STATES PATENT OFFICE 2,175,475

STABLE UREA-FORMALDEHYDE RESIN SOLUTION

Oskar R. Ludwig, Philadelphia, Pa., assignor to The Resinous Products & Chemical Company, Philadelphia, Pa.

No Drawing. Application December 28, 1937, Serial No. 182,157

7 Claims. (Cl. 260—29)

This invention relates to production of a urea formaldehyde condensate suitable for use as a heat hardenable adhesive in such commercial usages as the production of plywood.

It has heretofore been proposed to utilize partial condensates of urea and formaldehyde in the joining together of the laminae of plywood and in uniting a veneer surface to its base. Such proposals have however never been commercially successful because of the instability of the intermediate, soluble condensation products. It is known that when urea and formaldehyde are condensed, the reaction product passes through a series of stages. In the early stages of condensation the product is soluble in water but as the reaction progresses water solubility progressively diminishes until a final insoluble infusible resin is obtained. At elevated temperatures the reaction proceeds rather rapidly, particularly if an acid condensing agent is present, but even at room temperatures condensation proceeds after once started. For this reason the usual aqueous intermediate condensates are not stable solutions and frequently while being stored or transported from place to place solidify or gelatinize. When this occurs the resin is condensed beyond the point at which it can be dissolved and is useless for adhesive purposes.

A further disadvantage to the conventional urea-formaldehyde intermediate condensates as commercial adhesives is that they are difficult to obtain in concentrated solution. Attempts to concentrate them even by vacuum distillation frequently cause the formation of insoluble, gelatinous masses. For commercial use a more concentrated solution than has heretofore been feasible is desirable.

It is accordingly the object of this invention to provide a method for preparing water soluble intermediate condensation products of urea and formaldehyde that are stable at normal temperatures and which can be concentrated without danger of the resin passing to the insoluble form.

This object has been accomplished through the discovery that relatively small amounts of chlorides of the alkaline earth metals when present during the condensation have a remarkable stabilizing effect on urea-formaldehyde intermediate condensates.

This effect may be illustrated by comparative data on resins made under the same conditions in the presence of various amounts of calcium chloride and in the absence of calcium chloride. The condensate from which calcium chloride was omitted was pasty after its preparation and its consistency advanced very rapidly. The product became lard-like after two to three weeks. Its condensation stage advanced on standing at room temperature and its miscibility with water became very limited. Its usefulness as an adhesive was limited to from two to three weeks after its preparation.

The condensates containing from 5 to 10% of calcium chloride were fluid after their preparation and remained fluid for more than five months. The change in their consistency was slight and their miscibility with water was maintained.

A further advantage of this invention is that it permits the use of the cheaper fertilizer grade urea in the preparation of the adhesive. Even with this unpurified grade of urea, stable intermediate condensates can be prepared.

In practicing the invention the urea, aqueous formaldehyde, and the chloride of alkaline earth metal are mixed and heated for a relatively short time and then, if desired, concentrated at low temperatures and under high vacuum to a viscous product. The molecular ratio of formaldehyde to urea may be varied between 1 and 2.5 mols of formaldehyde to 1 mol of urea, with the preferable ratio about 1.7 to 2 mols of formaldehyde to each mol of urea. From about 5 to 20%, preferably about 10%, of the urea may be replaced by equivalent amounts of thiourea in order to improve the water resistance of the resin.

The amounts of alkaline earth chlorides that should be used depend primarily on the quantity of urea and appear to be independent of the urea-formaldehyde ratio. Calcium chloride which is typical of this group and preferred for economic reasons has but little effect on the product if used in amounts of less than 3% based on the urea. The effect increases proportionally to the amount up to about 10%. Larger quantities, even up to 25% and higher, may be used and give good results but without added advantage. Amounts between 5% and 10% give very stable solutions of intermediate condensate. The other chlorides of the alkaline earth metals such as magnesium chloride, strontium chloride, and barium chloride, have the same effect as calcium chloride when used in equivalent amounts.

The condensation is carried out in substantially neutral media by heating the reaction mixture for a relatively short time (one to five hours) at about 70 to 100° C. under atmospheric pressure. The reaction period depends on the reaction temperature used and is measured by determining the viscosity of the reaction mixture. It is carried beyond the stage of the formation of crystalline methylol compounds to the point at which amorphous products of relatively low molecular weight are formed.

In carrying out the reaction the following procedure is recommended.

A mixture of 1 mol of urea and 1.8 to 2.0 mols of formaldehyde, preferably used as a 37% aqueous solution, is neutralized according to known methods. 10% of the urea may be replaced advantageously by the equivalent amount of thiourea. To the neutral mixture 5-10% calcium chloride, CaCl₂, or equivalent amounts of the chlorides of other alkaline earth metals, is added and the solution heated to about 85–90° C. At these temperatures, the condensation is continued until the reaction mixture reaches a viscosity of between 0.08 to 0.21 poise, which will require from 1½ to 4 hours under the conditions described. The reaction mixture is then cooled to about 30–40° C. and concentrated under vacuum to about 60–80% solids or until the product has a viscosity of about Q to W according to the Gardner-Holdt scale.

By this procedure adhesive resin solutions may be made from batches containing the following combination of ingredients:

| | | Pounds |
|---|---|---|
| (a) | 37% aqueous formaldehyde | 100 |
| | Fertilizer urea | 37 |
| | Thiourea | 5.2 |
| | Calcium chloride | 2 |
| (b) | 37% aqueous formaldehyde | 100 |
| | Fertilizer urea | 33.3 |
| | Thiourea | 4.7 |
| | Magnesium chloride | 3.2 |
| (c) | 37% aqueous formaldehyde | 100 |
| | Fertilizer urea | 37 |
| | Thiourea | 5.2 |
| | Barium chloride | 3.8 |
| (d) | 37% aqueous formaldehyde | 100 |
| | Fertilizer urea | 33.3 |
| | Thiourea | 4.7 |
| | Strontium chloride | 2.9 |

These formulae and the preceding detailed description of one method of practicing the invention are given to illustrate how it can be applied. Other formulae and procedures and modifications of those given can be practiced without departing from the principles herein disclosed.

The resin compositions obtained by the present invention, as has been heretofore stated, are stable and may be stored for long periods even in concentrated form without danger of condensation progressing to a harmful degree. They may be used for a variety of industrial purposes, foremost among which is as an adhesive composition for bonding wood laminae. Another adhesive use of the material is the preparation of water-proof abrasive wherein the resin is used to bond particles of abrasive materials, such as quartz or carborundum into a solid mass or to a backing of cloth or paper, as for instance, in the preparation of sandpaper. The resin may also be used in the preparation of so-called laminated paper, in the finishing of textiles, and in various other ways known to the art. For such applications, it is often advantageous to mix with the urea-formaldehyde condensate certain softeners or plasticizers which contribute flexibility and toughness to an otherwise brittle and rigid resin. Such softeners may be selected from a wide range of substances, such as polyhydric alcohols, sulfonamids, formaldehyde reaction products of carbamates, and other resins of widely varying nature, which, if insoluble, may be conveniently added as resin-in-water emulsions.

In using the resin as an adhesive in the preparation of plywood the solution is spread homogeneously on the surface of the laminae by brushing, spraying, or roller coating, and the coated laminae pressed together and heated for a short time to convert the resin to the infusible insoluble form. To accelerate this final conversion an acidic condensing agent or a potentially acid condensing agent such as diammonium phosphate is added to the resin in solution or applied to the coated sheet prior to pressing. When converted to the insoluble infusible state the resin forms a bond of high strength and water resistance between the layers of wood.

In the following claims the word "urea" is used as including a mixture of urea and up to 20% by weight of thiourea. The percentages of alkaline earth chlorides specified are percentages by weight based on the amount of urea used.

I claim:

1. The process of preparing a stable aqueous solution of a urea formaldehyde intermediate condensate which comprises heating a neutral aqueous solution of urea and formaldehyde in the presence of an amount of an alkaline earth chloride chemically equivalent to from 3 to 25% of calcium chloride based on the weight of urea, until amorphus products of relatively low molecular weight are formed and then cooling the mixture to stop the reaction.

2. The process of preparing a stable aqueous solution of a urea formaldehyde intermediate condensate which comprises heating a neutral aqueous solution of urea and from 1 to 2.5 molecular equivalents of formaldehyde in the presence of an amount of an alkaline earth chloride chemically equivalent to from 3 to 10% of calcium chloride based on the weight of urea until amorphous products of relatively low molecular weight are formed and then cooling the mixture to stop the reaction.

3. The process of preparing a stable aqueous solution of a urea formaldehyde intermediate condensate which comprises heating a neutral aqueous solution of urea and from 1.7 to 2 molecular equivalents of formaldehyde in the presence of from approximately 5 to 10% of calcium chloride until the reaction mixture reaches a viscosity of from 0.08 to 0.21 poise and cooling the mixture to stop the reaction.

4. The process of preparing a concentrated stable aqueous solution of a urea formaldehyde intermediate condensate which comprises heating a neutral aqueous solution of urea and formaldehyde in the presence of an amount of an alkaline earth chloride chemically equivalent to from 3 to 10% of calcium chloride based on the weight of urea until amorphous products of relatively low molecular weight are formed, cooling the reaction mixture to stop the reaction and concentrating the same under vacuum to a concentration of from 60 to 80% solids.

5. As a new article of manufacture the stable aqueous solution of urea formaldehyde intermediate condensate as prepared by the process of claim 1.

6. As a new article of manufacture the stable aqueous solution of urea formaldehyde intermediate condensate as prepared by the process of claim 2.

7. As a new article of manufacture the stable aqueous solution of urea formaldehyde intermediate condensate as prepared by the process of claim 4.

OSKAR R. LUDWIG.